United States Patent [19]
Weisend, Jr.

[11] Patent Number: 5,449,134
[45] Date of Patent: Sep. 12, 1995

[54] APPARATUS AND METHOD FOR PROVIDING A PNEUMATIC DE-ICER WITH A REPLACEABLE ENVIRONMENT RESISTANT SURFACE

[75] Inventor: Norbert A. Weisend, Jr., Cuyahoga Falls, Ohio

[73] Assignee: The B. F. Goodrich Company, Akron, Ohio

[21] Appl. No.: 126,832

[22] Filed: Sep. 24, 1993

[51] Int. Cl.⁶ .............................................. B64D 15/00
[52] U.S. Cl. ................................. 244/134 R; 244/121
[58] Field of Search ................. 244/134, 121, 123, 133

[56] References Cited

U.S. PATENT DOCUMENTS

| | | | |
|---|---|---|---|
| 1,998,809 | 4/1935 | Geer | 244/31 |
| 2,828,237 | 3/1958 | Rosser . | |
| 3,370,814 | 2/1968 | Kageorge et al. | 244/134 |
| 3,423,225 | 1/1969 | Coney et al. . | |
| 3,559,928 | 2/1971 | Dohmeyer | 244/121 |
| 3,604,666 | 9/1971 | Achberger | 244/134 A |
| 3,642,567 | 2/1972 | Rogers, Jr. . | |

FOREIGN PATENT DOCUMENTS

WO81/0009-93 4/1981 WIPO .

OTHER PUBLICATIONS

Estane ® Erosion Material Installation Procedure, #90-30-075, Jun. 20, 1990, BFG Aerospace De-Icing Systems.

Report 75-23-062E, Aug. 2, 1993, BF Goodrich Aerospace De-Icing Systems.

Report 80-32-036C, Nov. 1, 1989, BF Goodrich Aerospace De-Icing Systems.

Report 82-32-003, Jan. 25, 1982, BF Goodrich Engineered Products Group.

Report 82-32-030, May 11, 1982, BF Goodrich Engineered Products Group.

*Primary Examiner*—Galen L. Barefoot
*Attorney, Agent, or Firm*—Kevin L. Leffel

[57] ABSTRACT

Apparatus and method for providing a pneumatic de-icer structure having a replaceable environment resistant surface are disclosed. A separable adhesive impermanently bonds the environment resistant surface to the de-icer structure. The environment resistant layer can be repeatedly replaced until the cycle life of the pneumatic de-icer structure is depleted.

25 Claims, 3 Drawing Sheets

APPARATUS AND METHOD FOR PROVIDING A PNEUMATIC DE-ICER WITH A REPLACEABLE ENVIRONMENT RESISTANT SURFACE

BACKGROUND OF THE INVENTION

This invention relates to aircraft de-icing equipment and more particularly to an improved pneumatic de-icer adapted for attachment to an airfoil to retard the accumulation of ice.

Pneumatic de-icing systems are commonly used on general aviation and regional airline aircraft. A typical system includes a pneumatic de-icer having a series of resilient inflatable tubes covering an airfoil, and an air supply system for alternatively inflating and deflating the tubes to flex local regions of the exterior surface of the de-icer when mounted on an airfoil. This flexing progressively shatters ice layers as they may form on the exterior surfaces of the de-icer and the broken ice particles are blown off by an airstream passing over the airfoil developed during flight.

The de-icer must be cycled during icing conditions and, over time, the de-icer will begin to accumulate cycle stress damage (akin to fatigue damage) which eventually causes the de-icer to fail. The number of cycles a de-icer can withstand before failure is generally called the "cycle life." Icing conditions ordinarily exist only for a relatively small part of the total aircraft flight time. If cycle life were the only limitation, a pneumatic de-icer could potentially last a very long time. However, the exposed surface of the de-icer is also subject to degrading environmental conditions the entire time the de-icer is mounted on the aircraft. Examples of such conditions include rain erosion, impact by sand and small stones during landing and take-off, and exposure to fuel, de-icing fluids, hydraulic fluids, engine exhaust gasses, sun, ozone and other atmospheric gasses. These degrading conditions combine and can seriously shorten the useful life of a de-icer. As a consequence, de-icers must often be replaced due to surface failure when the resilient inflatable tubes still have significant remaining cycle life.

Pneumatic de-icers were originally constructed of fabric reinforced natural rubber. An example of such a de-icer is presented in U.S. Pat. No. 1,998,809 MEANS AND METHOD FOR CONTROLLING THE ACCUMULATION OF ICE UPON SURFACES EXPOSED TO ICE FORMING CONDITIONS, issued to William C. Geer, Apr. 23, 1935. This de-icer had a natural rubber outer layer that was exposed to the surrounding environment when mounted on the aircraft. The outer layer would necessarily have a sufficient thickness in order to withstand environmental conditions, particularly rain and sand erosion.

Other possibilities arose with the advent of new materials. Some synthetic elastomeric materials have better resistance to environmental conditions and are also suitable for use in a pneumatic de-icer. Pneumatic de-icers remove ice by developing a substantial distortion in the outer layer. Deflections over the resilient tubular members are generally 0.25 inch or greater which results in outer surface elongation (strain) of 40% or more. In order to achieve these deflections, the outer surface must be formed of a material having good resilience over a temperature range from well below freezing to well above normal atmospheric temperatures. Examples of such materials include chloroprene rubber and polyurethane elastomer. These materials were incorporated into the outer layer in order to improve environmental resistance. However, chloroprene rubber and polyurethane elastomer have less resilience than natural rubber. Therefore, a hybrid surface layer was developed having a layer of synthetic elastomer bonded to a layer of natural rubber. The synthetic elastomer forms the exposed surface of the mounted de-icer. This type of de-icer has better environmental resistance than an all natural rubber de-icer while maintaining sufficient outer layer resilience. Examples of de-icers having a hybrid outer layer are presented in U.S. Pat. No. 3,370,814 AIRCRAFT DE-ICING SHOE, issued to Kageorge et al., Feb. 27, 1968, and U.S. Pat. No. 3,604,666 PNEUMATIC DEICER, issued to Melvin B. Achberger, Sep. 14, 1971.

Another way of increasing the life of a de-icer on an aircraft is by patching holes, scuffs, eroded and otherwise degraded areas in the surface of the de-icer. Patching techniques are known in the art. Under known techniques, a thin elastomeric patch is bonded over the effected area. The patch is usually reinforced by fabric material. The patch is installed with the intent that it remain adhered for the remaining life of the de-icer. Though used extensively, this approach is limited since ice removal performance can be effected if too many patches are applied to the de-icer. The patches also adversely effect the appearance of the de-icer.

In spite of these developments, means of improving the environmental resistance of a pneumatic de-icer are desired. Specifically, a de-icer is desired that permits full utilization of its cycle life on the aircraft. Each of the pneumatic de-icers discussed thus far is formed as a permanently cohesive unit. When the outer surface fails, the failure must either be patched or the entire de-icer must be stripped from the aircraft and replaced. Patches provide only a limited solution, as discussed previously. Therefore, means of refurbishing the outer layer are desired without replacing the entire de-icer.

SUMMARY OF THE INVENTION

According to the invention, a de-icer is provided comprising: a pneumatic de-icer structure having an exterior surface and an opposing attachment surface; an elastomeric environment resistant layer overlying the pneumatic de-icer structure proximate the exterior surface; and, a separable adhesive layer between the environment resistant layer and the pneumatic de-icer structure, the separable adhesive layer impermanently bonding the environment resistant layer to the pneumatic de-icer structure.

According to one embodiment, the pneumatic de-icer structure may include: a first layer having a first fabric; a second layer having an extensible fabric overlying the first layer; attachment means for attaching the first layer to the second layer in a predetermined pattern that creates inflatable passages between the first and second layers; an elastomeric stretch layer overlying the second layer wherein the pneumatic de-icer structure forms a cohesive unit with a portion of the elastomeric stretch layer forming the exterior surface and a portion of the first layer forming the attachment surface.

According to another embodiment, the environment resistant layer is a supplemental environment resistant layer and the pneumatic de-icer structure includes: a first layer having a first fabric; a second layer having an extensible fabric overlying the first layer; attachment means for attaching the first layer to the second layer in a predetermined pattern that creates inflatable passages between the first and second layers; an elastomeric stretch layer overlying the second layer; and, an elastomeric primary environment resistant layer overlying the stretch layer wherein the pneumatic de-icer structure forms a cohesive unit with a portion of the primary environment resistant layer forming the exterior surface and a portion of the first layer forming the exterior surface.

According to another aspect of the invention, a method is provided comprising the steps of: providing a pneumatic de-icer structure having an exterior surface and an opposing attachment surface; and, impermanently bonding an environment resistant layer to the pneumatic de-icer structure over the exterior surface with a separable adhesive.

The preceding method may further comprise the steps of: removing the environment resistant layer; providing a new environment resistant layer; and, impermanently bonding the new environment resistant layer to the pneumatic de-icer structure over the exterior surface with a separable adhesive.

According to another aspect of the invention, a method is provided comprising the steps of:

(a) providing a de-icer including a pneumatic de-icer structure having an exterior surface and an opposing attachment surface; an elastomeric environment resistant layer overlying the pneumatic de-icer structure proximate the exterior surface; and, a separable adhesive layer between the environment resistant layer and the pneumatic de-icer structure, the separable adhesive layer impermanently bonding the environment resistant layer to the pneumatic de-icer structure;

(b) removing the environment resistant layer;

(c) providing a new environment resistant layer; and, (d) impermanently bonding the new environment resistant layer to the pneumatic de-icer structure over the exterior surface with a separable adhesive.

DETAILED DESCRIPTION

According to the invention, a de-icer for retarding accumulation of ice is provided having a removable and replaceable environment resistant layer. The de-icer is mounted on an aircraft and subjected to environmental conditions during flight. The environment resistant layer is removed upon failure and replaced with a new environment resistant layer, preferably while the de-icer is still mounted on the aircraft. In this manner, the surface of the de-icer can be replenished or replaced until the cycle life of the de-icer is exhausted. The invention thereby permits utilization of a de-icer's full cycle life on an aircraft.

Figure 1:
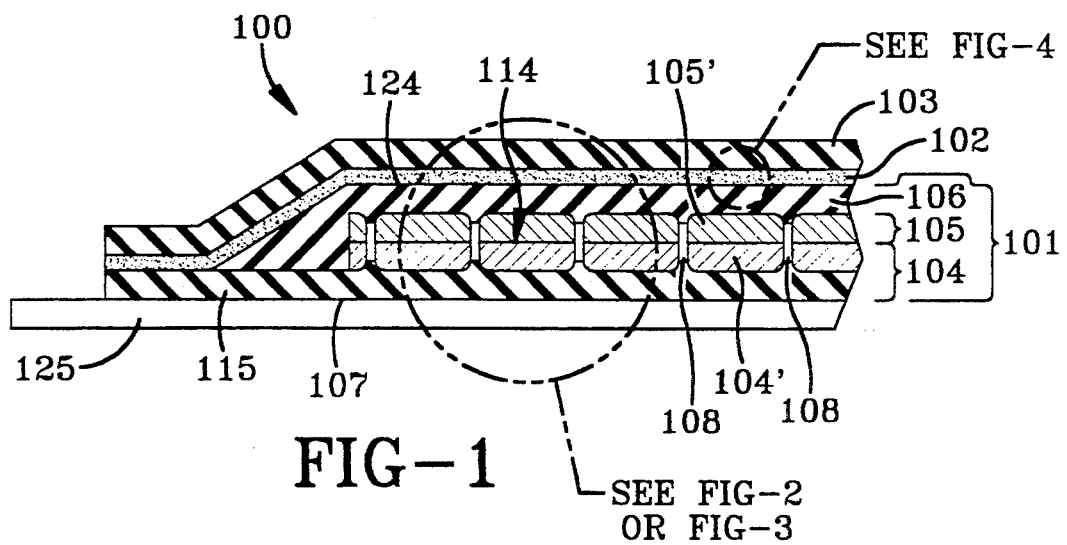
FIG. 1 is a sectional view of a pneumatic de-icer according to the invention.

A de-icer according to the invention and various embodiments thereof are presented in FIGS. 1 through 7, wherein like numbered components are equivalent. Dimensions in these figures are not to scale and are exaggerated in order to more clearly present the invention. Referring to FIG. 1, a de-icer 100 is presented having a pneumatic de-icer structure 101, a separable adhesive layer 102, and an environment resistant layer 103 impermanently bonded to the pneumatic de-icer structure 101 by the separable adhesive layer 102. De-icer 100 has a length which is not shown since FIG. 1 is a sectional view, and a width which is not fully shown because de-icer 100 is presented severed along the right side along a hypothetical line in order to more clearly demonstrate the various layers. The severed portion that is not presented can be assumed to be a mirror image of the portion that is presented for the purposes of describing the invention. De-icer 100 is predominantly formed of elastomeric materials reinforced by fabric. De-icer 100 has an attachment surface 107 and is shown attached to an aircraft skin or structure 125. Though shown flat for the sake of clarity, it is to be understood that the aircraft structure 125 is normally curved, such as the leading edge of a wing or engine inlet. De-icer 100 is preferably attached to the aircraft structure 125 using a soluble rubber based adhesive such as catalogue number 1300L manufactured by 3M, St. Paul, Minn., U.S.A. Methods of attaching pneumatic de-icers to aircraft structures are well known in the art.

Pneumatic de-icer structure 101 has an exterior surface 124 in opposing relationship with the attachment surface 107. The pneumatic de-icer structure 101 comprises a first layer 104 having a first fabric 104' and a bond layer 115. A portion of the first layer 104 forms the attachment surface 107. A second layer 105 has an extensible fabric 105' and overlies the first layer 104. Attachment means 108 attach the first layer 104 to the second layer 105 in a predetermined pattern that creates inflatable passages 114 between the first and second layers 104 and 105. Examples of predetermined patterns of inflatable passages are presented in U.S. Pat. No. 4,494,715 issued to Weisend, Jr. and U.S. Pat. No. 4,779,823 issued to Ely et al. The pattern can take many forms such as spanwise tubes, chordwise tubes, or a combination of chordwise and spanwise tubes. The specific pattern is not critical in the practice of the invention. A stretch layer 106 overlies the second layer 105. A portion of stretch layer 106 forms the exterior surface 124. The first layer 104, the second layer 105, the attachment means 108, and the stretch layer 106 form a cohesive unit constituting the pneumatic de-icer structure 101. Pneumatic de-icer structure 101 is preferably formed as a permanently cohesive unit.

Stretch layer 106 is formed from an elastomeric material having excellent resilience over the operating temperature range of the de-icer. A representative operating range for a pneumatic de-icer under normal operating conditions is about −65° F. to 160° F. The term "resilience" is intended to refer to an elastomeric material's ability to return its original dimensions despite repeated elongations from cyclic inflation of a pneumatic de-icer. Natural rubber is an example of such a material, and is the best material known for use in stretch layer 106 under normal operating conditions. However, any other elastomer having comparable resilience is considered to be within the purview of this invention.

Figure 2:
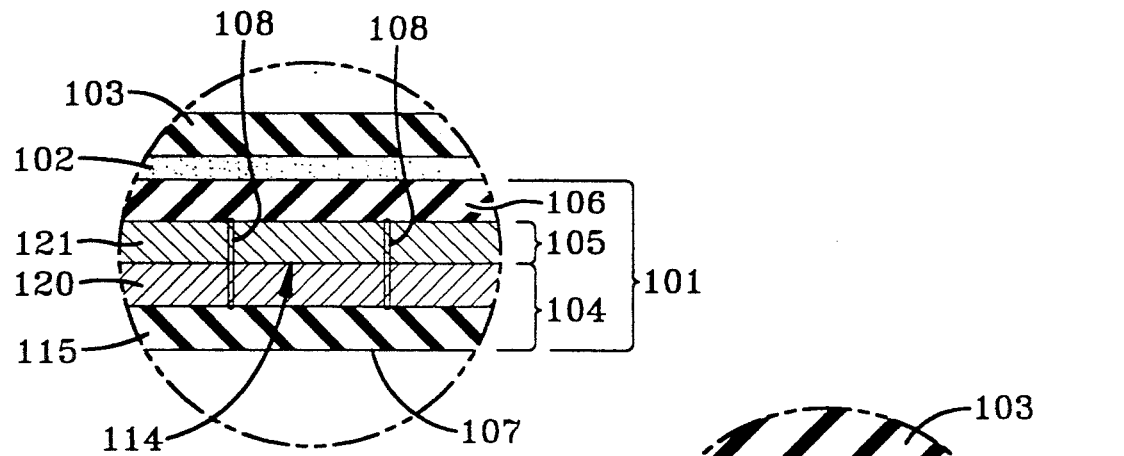
FIG. 2 is a detail view of one embodiment of the de-icer depicted in FIG. 1.
Figure 3:
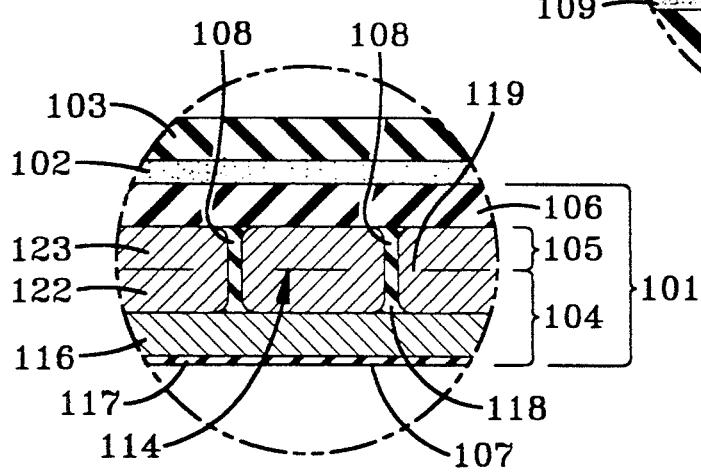
FIG. 3 is a detail view of an alternate embodiment of the de-icer depicted in FIG. 1.
Figure 5:
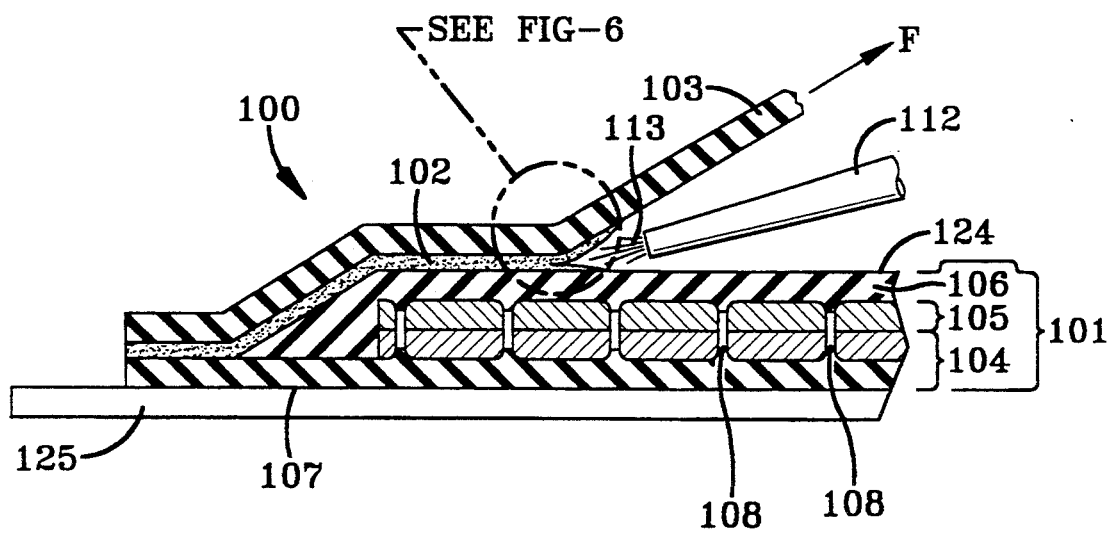
FIG. 5 is a sectional view of a pneumatic de-icer according to the invention in the process of having the environment resistant layer removed.

Two alternatives for forming pneumatic de-icer structure 101 are presented in FIGS. 2 and 3. Figure 2 represents a sewn-type pneumatic de-icer structure which is preferred. First layer fabric 120 and the second layer extensible fabric 121 are coated on one surface with elastomeric material. The uncoated surfaces are placed immediately adjacent each other and the two layers are sewn together in a predetermined pattern that defines the multitude of inflatable passages 114. The facing fabric surfaces can be napped to facilitate flow of pressurized fluid (such as air) to the inflatable passages 114. Attachment means 108 are parallel rows of stitching. The stretch layer 106 is bonded to the second layer 105. First layer fabric 120 is bonded to an attachment layer 115. Attachment layer 115 has a surface 107 adapted to be attached to an aircraft surface. Second layer extensible fabric 121 is preferably a tricot woven polyamide (nylon) fabric coated on one surface with natural rubber. First layer fabric 120 is preferably a square woven polyamide (nylon) fabric coated on one surface with natural rubber. The two layers are preferably sewn together with polyamide (nylon) thread. Attachment layer 115 is preferably a chloroprene rubber. Cement layers (not shown) are provided between the various layers of the pneumatic de-icer structure 101 (except between the first and second layer fabrics 120 and 121) that bond the pneumatic de-icer structure 101 into a permanently cohesive unit. Appropriate tie-in cements are also necessary between layers having dissimilar materials. Suitable elastomer compounds, fabrics, bond cements, and tie-in cements for use in pneumatic de-icer structure 101 are well known in the pneumatic de-icer art. The pneumatic de-icer structure 101 is preferably constructred from uncured elastomer compounds, bond cements, and tie-in cements and subsequently cured under heat and pressure in an autoclave. Means for inflating the inflatable passages 114 with pressurized fluid must also be provided. Such means consist of an air connection in fluid communication with the inflatable passages and possibly a manifold to distribute the pressurized fluid within the de-icer. A manifold may not be necessary depending on the application since the pressurized fluid (preferably air) can pass through the thread attachments to some extent. Such inflation means are well known in the pneumatic de-icer art.

Referring to FIG. 3, an alternate and less preferred tube-type pneumatic de-icer structure embodiment is presented. Strips of extensible fabric coated on at least one surface with elastomeric material are wrapped into flattened tubes having opposing walls 122 and 123 joined by folds 119. Wall 122 forms a part of first layer 104 and wall 123 forms a part of second layer 105. Narrow elastomeric strips 118 are placed between the individual tubes. Attachment means 108 are the folds 119 between the tube walls 122 and 123 and include strips 118. The stretch layer 106 is bonded to the tubes. An inextensible fabric layer 116 is bonded to the other side of the tubes. A thin elastomeric attachment layer 117 is bonded to inextensible fabric layer 116. The extensible tube fabric is preferably a tricot woven polyamide (nylon) fabric coated on at least one surface with natural rubber. The tube is preferably formed with the fabric surface inside the tube. If the tube is coated on both surfaces, a release material such as soapstone must be provided inside the tube. The thin elastomeric strips 118 are preferably formed from natural rubber. Inextensible fabric layer 116 is preferably a square woven polyamide (nylon) fabric coated on both sides with natural rubber. Thin attachment layer 117 is preferably formed by applying a compounded polychloroprene cement to fabric layer 116 and evaporating the solvent. Stretch layer 106 is preferably natural rubber. Cement layers (not shown) are provided between the various layers of the pneumatic de-icer structure 101 (except between the opposing walls 122 and 123) that bond the pneumatic de-icer structure 101 into a permanently cohesive unit. Appropriate tie-in cements are also necessary between layers having dissimilar materials. Suitable elastomer compounds, fabrics, bond cements, and tie-in cements are well known in the pneumatic de-icer art. The pneumatic de-icer structure is preferably constructed from uncured elastomer compounds, bond cements, and tie-in cements and subsequently cured under heat and pressure. In a tube-type pneumatic de-icer structure, inflation manifolds are necessary. Means for inflating the inflatable passages 114 with pressurized fluid must also be provided. Openings must be provided in each inflatable passage to permit fluid communication between the inflatable passages and the inflation manifold. An air connection is attached to the manifold to communicate a pressurized fluid to the inflatable passages via the manifold. Such inflation means are well known in the pneumatic de-icer art.

Referring again to FIG. 1, the elastomeric environment resistant layer 103 overlies a substantial portion of the de-icer structure 101 proximate the stretch layer 106. The term "substantial portion" means at least 10% of the pneumatic de-icer structure surface, and includes 20%, 30%, 40%, on up to 90% or 100% of the pneumatic de-icer structure surface. For example, the environment resistant layer could be confined to only high erosion areas, such as the forward-most portion of a de-icer first impacted by an airstream, in which case the environment resistant layer 103 would cover less than 100% of the pneumatic de-icer structure 101. Conversely, the environment resistant layer could cover 100% of the de-icer structure surface as depicted in FIG. 1.

The environment resistant layer 106 is formed from elastomeric material and preferably comprises material selected from the group consisting of choloroprene rubber and polyurethane elastomer. These materials share common properties in having satisfactory resilience over the operating temperature range of the de-icer ($-65°$ F. to $160°$ F.) and better environmental resistance than natural rubber. Other elastomeric materials having similar properties should also be suitable and are considered to be within the purview of this invention. Thickness of the environment resistant layer is preferably greater than about 0.01 inch. The upper limit for the thickness depends on the application and could be as high as about 0.06 inch in a highly degrading environment, such as a helicopter blade. A range of about 0.01 to 0.03 inch should be satisfactory for most applications.

The separable adhesive layer 102 lies between the environment resistant layer 103 and the de-icer structure 101 and impermanently bonds the environment resistant layer 103 to the de-icer structure 101 over a substantial portion of the stretch layer 106. Adhesive layer 102 must form a bond strong enough to resist detachment of the environment resistant layer 103 during service on the aircraft. However, adhesive layer 102 is separable because it impermanently bonds the environment resistant layer 103 to pneumatic de-icer structure 101 in the sense that the bond can be eliminated or released at will in order to permit replacement of the environment resistant layer 103. For example, separable adhesive layer 102 may be formed from a soluble adhesive. The separable adhesive bond must be strong enough to resist detachment during service on the aircraft, but must also be susceptible to release by dissolving the adhesive. A removal process is presented in FIG. 5 where a nozzle means 112 supplies a stream of solvent 113 directed at the separable adhesive layer 102. The solvent 113 must have properties that permit it to attack the separable adhesive layer 102 without attacking or damaging the substructure 101 or attacking the erosion resistant layer 103 in a manner that renders it difficult to remove. The bond is progressively destroyed from one side of the de-icer to other as the environment resistant layer 103 is pulled from the surface by a force F. Force F may be generated by hand pulling layer 103, possibly with the help of pliers. In such manner, a worn environment resistant layer 103 can be removed and subsequently replaced by a new environment resistant layer 103. The new environment resistant layer 103 is bonded to the pneumatic de-icer structure 101 with a new separable adhesive layer 102. This sequence may be repeated until the de-icer's cycle life is exhausted.

Variations are possible. For example, the entire de-icer (including the environment resistant layer 103, separable adhesive layer 102, and pneumatic de-icer structure 101) could be cured in the factory under heat and pressure in an autoclave to form a unitary structure. The environment resistant layer 103 could later be removed and replaced in the field after the de-icer is mounted on an aircraft.

Figure 4:
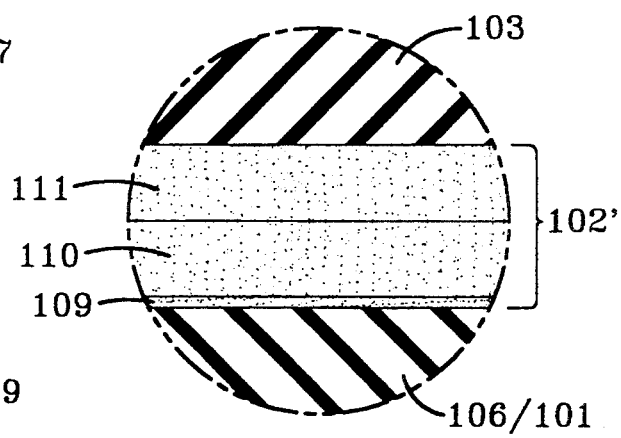
FIG. 4 is a detail view of one embodiment of a separable adhesive layer.

A preferred embodiment for the separable adhesive layer is presented in FIG. 4. Separable adhesive layer 102' includes a soluble adhesive layer 109 and two thermoset adhesive layers 110 and 111. Soluble adhesive layer 109 is preferably a primer of chlorinated natural rubber in solvent such as catalogue number PL-315 available from The B. F. Goodrich Company, Akron, Ohio, U.S.A. Adhesive layers 110 and 111 are preferably a thermoplastic polyurethane in solvent solution (methyl-ethyl-ketone and tetrahydrofurane) such as catalogue number A1503B with an isocyanate prepolymer (diphenylmethane diisocyanate prepolymer) such as catalogue number A1343B available from The B. F. Goodrich Company. Separable adhesive layer 102' is applied as follows. The soluble adhesive layer 109 is applied over a substantial portion of stretch layer 106 of the pneumatic de-icer structure 101 and permitted to dry. Adhesive layer 110 is then applied over soluble adhesive layer 109 and permitted to dry. Adhesive layer 111 is applied over a corresponding portion of one surface of environment resistant layer 103 and permitted to dry. As soon as possible after layers 110 and 111 are dry, one of the layers is rendered tacky (tackify) by wiping it with a cloth dampened with methyl-ethyl-ketone or methyl-isobutyl-ketone. The two layers are then joined creating a bond between the pneumatic de-icer structure 101 and environment resistant layer 103. The bonding process must take place before the thermoset polyurethane cures which is why the layers must be joined as soon as possible after layers 110 and 111 are dry. Though less preferable, soluble adhesive layer 109 could also be adjacent the environment resistant layer 103. Extra care must be exercised in the application of A1503B to a polyurethane environment resistant layer 103. The methyl-ethyl-ketone and tetrahydrofurane solvents in A1503B may attack the polyurethane compounds commonly used for an environment resistant layer. In order to avoid this problem, adhesive layer 111 may be formed by two thin coats of A1503B rather than one thick coat. Applying two thin coats permits the solvents to quickly evaporate which prevents the solvent from destroying the environment resistant layer 103. Direct contact of any ketone solvent with a polyurethane environment resistant layer 106 should be avoided for the same reasons. Accordingly, great care must be exercised when using a ketone solvent to tackify an adhesive layer 111 applied to a polyurethane environment resistant layer 106.

Figure 6:
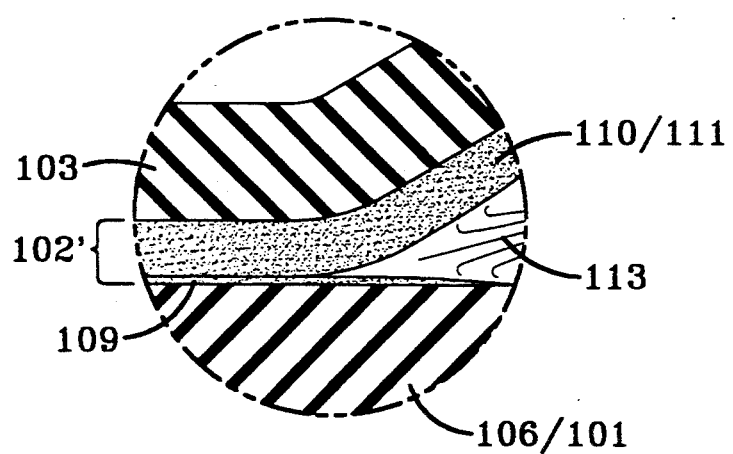
FIG. 6 is a detail view of one embodiment of the de-icer depicted in FIG. 5 in the process of having the environment resistant layer removed.

FIG. 6 depicts a detailed view of the process of separating an environment resistant layer bonded to the pneumatic de-icer structure by the preferred method just described. The environment resistant layer 103 is bonded to the stretch layer 106 by separable adhesive layer 102' according to the preferred method. Separable adhesive layer 102' is composed of soluble adhesive layer 109 and thermoset adhesive layers 110 and 111. Soluble adhesive layer 109 is shown immediately adjacent the stretch layer 106. A solvent stream 113 is directed at the soluble adhesive layer 109. The soluble adhesive layer 109 is dissolved releasing environment resistant layer 103 as shown. The chosen solvent must attack the primer layer without attacking the pneumatic de-icer structure 101 or environment resistant layer 103. Toluene is the preferred solvent if PL-315 primer is used for the soluble adhesive layer 109. Ketone solvents are generally unsuitable for releasing a polyurethane environment resistant layer 103 since such solvents may attack the polyurethane compounds commonly used for environmental resistance in de-icers, rendering it difficult to remove. The environment resistant layer 103 is released from one side of the de-icer to the other as previously discussed in relation to FIG. 5. Note that the cured thermoset polyurethane portion of the separable adhesive layer 102' remains adhered to the erosion resistant layer. Following separation, a new erosion resistant layer can be supplied and impermanently bonded to the stretch layer 106 by the same processes described above, preferably the process described in relation to FIG. 4. This removal/application process can be repeated many times until the cycle life of the de-icer is exhausted.

Figure 7:
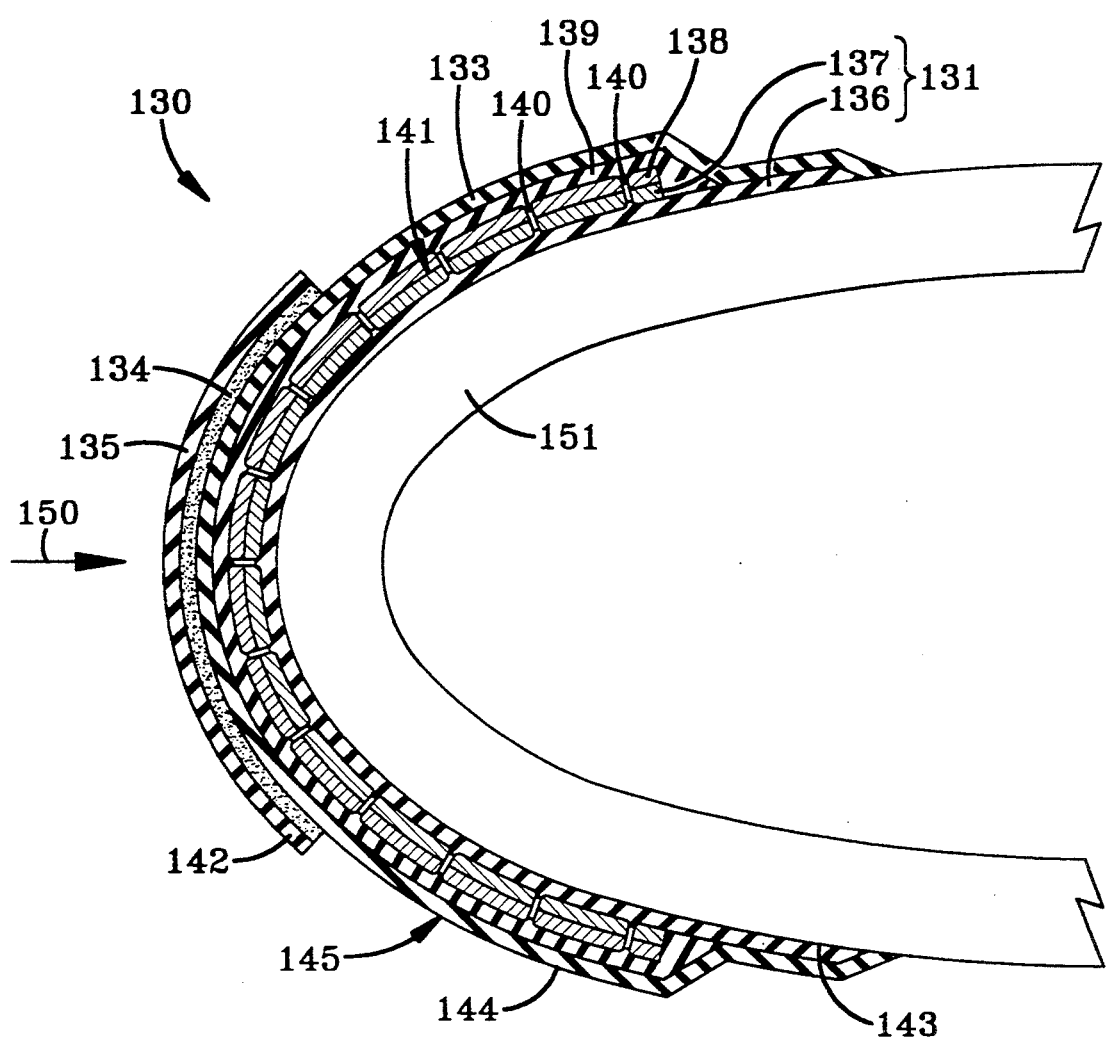
FIG. 7 is a sectional view of another embodiment of a pneumatic de-icer according to the invention.

Another embodiment is presented in FIG. 7. De-icer 130 is attached to an aircraft skin or structure 151 along an attachment surface 143. As discussed previously in relation to FIG. 1, a solvent based rubber adhesive is preferred for attaching de-icer 130 to the aircraft structure 151. De-icer 130 and aircraft structure 151 have a length which is not shown since FIG. 1 is a sectional view. Aircraft structure 151 is curved and is representative of a "leading edge." A "leading edge" is that portion of an aircraft structure that is first impacted by an impinging airstream. De-icer 130 is presented having a pneumatic de-icer structure 145, a separable adhesive layer 134, and a supplemental environment resistant layer 135 impermanently bonded to the pneumatic de-icer structure 145 by the separable adhesive layer 134. Pneumatic de-icer structure 145 has a primary environment resistant layer 133. The supplemental environment resistant layer 134 serves to locally increase the environmental resistance of the de-icer 130. For example, rain and sand erosion are typically most severe in the areas where an airstream 150 first impacts the de-icer 130. Supplemental environment resistant layer 135 provides additional local protection and can be removed upon failure and replaced by a new supplemental environment resistant layer 135. In such manner, the environment resistant layer can be renewed in high erosion areas without necessitating replacement of the entire primary erosion resistant layer 133. The primary or supplemental environment resistant layer may be formed from chloroprene rubber, polyurethane elastomer, or other elastomers having similar properties for use on a de-icer. Thickness of the supplemental environment resistant layer is preferably greater than about 0.01 inch. The upper limit for the thickness of the supplemental layer depends on the application and could be as high as about 0.060 inch in a highly degrading environment, such as a helicopter blade. A range of about 0.010 to 0.030 inch should be satisfactory for most applications.

Pneumatic de-icer structure 145 has an exterior surface 144 in opposing relationship with attachment surface 143. The pneumatic de-icer structure 145 comprises a first layer 131 having a first fabric 137 and a bond layer 136. A portion of the first layer 131 forms the attachment surface 143. A second layer 138 includes an extensible fabric and overlies the first layer 131. Attachment means 140 attach the first layer 131 to the second layer 138 in a predetermined pattern that creates inflatable passages 141 between the first and second layers 131 and 138. As discussed in relation to FIG. 1, the pattern can take many forms such as spanwise tubes, chordwise tubes, or a combination of chordwise and spanwise tubes. The specific pattern is not critical in the practice of the invention. A stretch layer 139 overlies the second layer 132. The first layer 131, the second layer 138, the attachment means 140, and the environment resistant layer 133 form a cohesive unit constituting the pneumatic de-icer structure 145. Pneumatic de-icer structure 145 is preferably formed as a permanently cohesive unit. Two alternatives for forming pneumatic de-icer structure 145 are possible (tube-type and sewn-type) as discussed in relation to FIGS. 2 and 3.

Separable adhesive layer 134 impermanently bonds the supplemental environment resistant layer 135 to the primary environment resistant layer 133. As discussed in relation to FIG. 1, separable adhesive layer 134 may be formed from a soluble adhesive. The PL-315, A1503B, and A1343B adhesives already discussed in relation to FIG. 1 are preferred. The edge 142 of supplemental environment resistant layer 135 can be tapered rather than square as shown.

Many variations are possible without departing from the scope and spirit of the invention. It will be apparent that, although specific embodiments have been described, the invention is not limited to the specifically illustrated and described constructions since variations may be made without departing from the principles of the invention.

I claim:

1. A de-icer, comprising: a pneumatic de-icer structure having an elastomeric exterior surface and an opposing attachment surface; an elastomeric environment resistant layer overlying said pneumatic de-icer structure proximate said exterior surface; and, a separable adhesive layer between said environment resistant layer and said pneumatic de-icer structure, said separable adhesive layer impermanently bonding said environment resistant layer to said pneumatic de-icer structure, said separable adhesive layer including a soluble adhesive layer and a thermoset adhesive layer.

2. The de-icer of claim 1 wherein said soluble adhesive layer is adjacent said exterior surface.

3. The de-icer of claim 1 wherein said soluble adhesive layer is a chlorinated rubber primer and said thermoset adhesive layer is a thermoset polyurethane adhesive.

4. The de-icer of claim 1 wherein said environment resistant layer comprises material selected from the group consisting of chloroprene rubber and polyurethane elastomer.

5. The de-icer of claim 1, wherein said pneumatic de-icer structure includes: a first layer having a first fabric; a second layer having an extensible fabric overlying said first layer; attachment means for attaching said first layer to said second layer in a predetermined pattern that creates inflatable passages between said first and second layers; an elastomeric stretch layer overlying said second layer wherein said pneumatic de-icer structure forms a cohesive unit with a portion of said elastomeric stretch layer forming said exterior surface and a portion of said first layer forming said attachment surface.

6. The de-icer of claim 5 wherein said pneumatic de-icer structure forms a permanently cohesive unit.

7. The de-icer of claim 5 wherein said stretch layer comprises natural rubber.

8. The de-icer of claim 1, wherein said environment resistant layer is a supplemental environment resistant layer and said pneumatic de-icer structure includes: a first layer having a first fabric; a second layer having an extensible fabric overlying said first layer; attachment means for attaching said first layer to said second layer in a predetermined pattern that creates inflatable passages between said first and second layers; an elastomeric stretch layer overlying said second layer; and an elastomeric primary environment resistant layer overlying said stretch layer wherein said pneumatic de-icer structure forms a cohesive unit with a portion of said primary environment resistant layer forming said exterior surface and a portion of said first layer forming said exterior surface.

9. The de-icer of claim 8 wherein said pneumatic de-icer structure forms a permanently cohesive unit.

10. The de-icer of claim 8 wherein said supplemental environment resistant layer comprises material selected from the group consisting of chloroprene rubber and polyurethane elastomer.

11. A method comprising the steps of: providing a pneumatic de-icer structure for retarding accumulation of ice having an elastomeric exterior surface and an opposing attachment surface attached to an aircraft structure; impermanently bonding an environment resistant layer to said pneumatic de-icer structure over said exterior surface with a separable adhesive; removing said environment resistant layer; providing a new environment resistant layer; and, impermanently bonding said new environment resistant layer to said pneumatic de-icer structure over said exterior surface with a separable adhesive.

12. The method of claim 11, wherein the step of impermanently bonding said environment resistant layer to said pneumatic de-icer structure over said exterior surface with a separable adhesive comprises the step of applying a soluble adhesive layer to said exterior surface.

13. The method of claim 12, wherein the step of impermanently bonding said environment resistant layer to said pneumatic de-icer structure over said exterior surface further comprises the steps of: applying a first thermoset adhesive layer over said soluble adhesive layer; applying a second thermoset adhesive layer over said removable environment resistant layer; and, bonding said removable environment resistant layer to said pneumatic de-icer structure by joining said first and second thermoset adhesive layers.

14. The method of claim 13, wherein said thermoset adhesive is a polyurethane thermoset adhesive and said soluble adhesive is a chlorinated rubber primer.

15. The method of claim 11, wherein the step of impermanently bonding said new environment resistant layer to said pneumatic de-icer structure over said exterior surface with a separable adhesive further comprises the step of applying a soluble adhesive layer to said exterior surface.

16. The method of claim 15, wherein the step of impermanently bonding said new environment resistant layer to said pneumatic de-icer structure over said exterior surface with a separable adhesive further comprises the steps of: applying a first thermoset adhesive layer over said soluble adhesive layer; applying a second thermoset adhesive layer over said removable environment resistant layer; and, bonding said removable environment resistant layer to said pneumatic de-icer structure by joining said first and second thermoset adhesive layers.

17. The method of claim 16, wherein said thermoset adhesive is a polyurethane thermoset adhesive and said soluble adhesive is a chlorinated rubber primer.

18. The method of claim 11, further comprising the step of subjecting said environment resistant layer to environmental conditions during flight before said step of removing said environment resistant layer.

19. The method of claim 11, wherein said separable adhesive layer comprises a soluble adhesive, and wherein said step of removing said environment resistant layer comprises the step of dissolving said soluble adhesive.

20. A method comprising the steps of: (a) providing a de-icer including a pneumatic de-icer structure for retarding accumulation of ice having an elastomeric exterior surface and an opposing attachment surface attached to an aircraft structure; an elastomeric environment resistant layer overlying said pneumatic de-icer structure proximate said exterior surface; and, a separable adhesive layer between said environment resistant layer and said pneumatic de-icer structure, said separable adhesive layer impermanently bonding said environment resistant layer to said pneumatic de-icer structure; (b) removing said environment resistant layer; (c) providing a new environment resistant layer; and, (d) impermanently bonding said new environment resistant layer to said pneumatic de-icer structure over said exterior surface with a separable adhesive.

21. The method of claim 20, wherein the step of impermanently bonding said new environment resistant layer to said pneumatic de-icer structure over said exterior surface with a separable adhesive further comprises the step of applying a soluble adhesive layer to said exterior surface.

22. The method of claim 21, wherein the step of impermanently bonding said new environment resistant layer to said pneumatic de-icer structure over said exterior surface with a separable adhesive further comprises the steps of: applying a first thermoset adhesive layer over said soluble adhesive layer; applying a second thermoset adhesive layer over said removable environment resistant layer; and, bonding said removable environment resistant layer to said pneumatic de-icer structure by joining said first and second thermoset adhesive layers.

23. The method of claim 22, wherein said thermoset adhesive is a polyurethane thermoset adhesive and said soluble adhesive is a chlorinated rubber primer.

24. The method of claim 20, wherein said environment resistant layer is subjected to environmental conditions during flight before said step of removing said environment resistant layer.

25. The method of claim 20, wherein said separable adhesive layer comprises a soluble adhesive, and wherein said step of removing said environment resistant layer comprises the step of dissolving said soluble adhesive.

* * * * *